United States Patent
Karnik et al.

(10) Patent No.: US 9,605,604 B2
(45) Date of Patent: Mar. 28, 2017

(54) TURBOCHARGER CONTROL

(75) Inventors: Amey Y. Karnik, Dearborn, MI (US); Mrdjan J. Jankovic, Birmingham, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 1305 days.

(21) Appl. No.: 12/726,283

(22) Filed: Mar. 17, 2010

(65) Prior Publication Data

US 2011/0225967 A1  Sep. 22, 2011

(51) Int. Cl.
| | | |
|---|---|---|
| *F02D 23/02* | (2006.01) | |
| *F02B 37/16* | (2006.01) | |
| *F02D 41/00* | (2006.01) | |
| F02B 23/10 | (2006.01) | |
| F02B 75/12 | (2006.01) | |
| F02D 13/02 | (2006.01) | |

(52) U.S. Cl.
CPC ............ *F02D 23/02* (2013.01); *F02B 37/16* (2013.01); *F02D 41/0007* (2013.01); *F02B 23/104* (2013.01); *F02B 2075/125* (2013.01); *F02D 13/0207* (2013.01); *F02D 13/0219* (2013.01); *F02D 2200/0406* (2013.01); *F02D 2200/703* (2013.01); *Y02T 10/144* (2013.01)

(58) Field of Classification Search
CPC ............. Y02T 10/144; F02D 41/0007; F02D 13/0207; F02D 23/02; F02D 2200/0406; F02D 2200/703; F02B 23/104; F02B 37/18; F02B 37/183; F02B 37/186; F02B 2075/125; F02B 37/16
USPC .......... 60/605.2, 624, 602; 123/383, 339.17, 123/339.21; 251/129.15, 129.16
See application file for complete search history.

(56) References Cited

U.S. PATENT DOCUMENTS

| | | | | |
|---|---|---|---|---|
| 4,703,625 A | * | 11/1987 | Caldwell | .......................... 60/602 |
| 4,709,676 A | * | 12/1987 | Monaghan | ..................... 123/383 |
| 5,036,803 A | | 8/1991 | Nolting et al. | |
| 5,590,630 A | * | 1/1997 | Kurihara | ................ F02D 31/005 123/339.17 |
| 6,253,551 B1 | | 7/2001 | Lohmann et al. | |
| 6,279,551 B1 | * | 8/2001 | Iwano et al. | .................. 60/605.2 |
| 6,510,692 B2 | | 1/2003 | Shirakawa | |
| 2004/0098985 A1 | * | 5/2004 | Tabata et al. | .................... 60/602 |
| 2004/0128996 A1 | | 7/2004 | Klingseis | |

(Continued)

FOREIGN PATENT DOCUMENTS

EP    2439393 A1 *  4/2012 ............. F02D 41/00

OTHER PUBLICATIONS

Mueller, M., "Estimation and Control of Turbocharged Engines", SAE Technical Paper Series No. 2008-01-1013, 2008 World Congress, Detriot, Michigan, Apr. 14-17, 2008.

(Continued)

*Primary Examiner* — Mary A Davis
(74) *Attorney, Agent, or Firm* — Julia Voutyras; McCoy Russell LLP

(57) ABSTRACT

Various systems and methods for controlling a turbocharger of an engine via a wastegate are described. In one example, the wastegate is adjusted according to a difference between the boost pressure and the atmospheric pressure. In this manner, the interdependency between controlling the boost pressure and using the boost pressure to actuate the wastegate in a boost-based wastegate configuration may be reduced.

20 Claims, 4 Drawing Sheets

(56) References Cited

U.S. PATENT DOCUMENTS

2008/0077304 A1    3/2008  Suzuki et al.
2009/0183507 A1*  7/2009  Weaver ................ F02B 37/186
                                                         60/602

OTHER PUBLICATIONS

Partial Translation of Office Action of Chinese Application No. 201110031437.8, Issued Jun. 24, 2014, State Intellectual Property Office of PRC, 9 Pages.

* cited by examiner

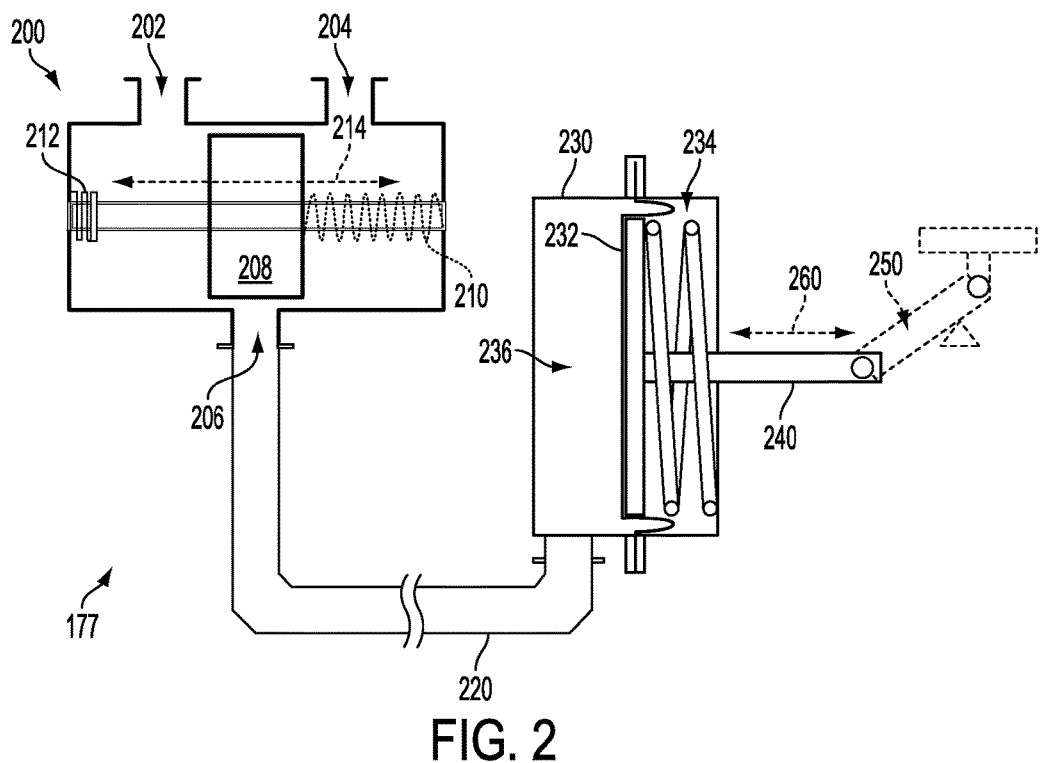
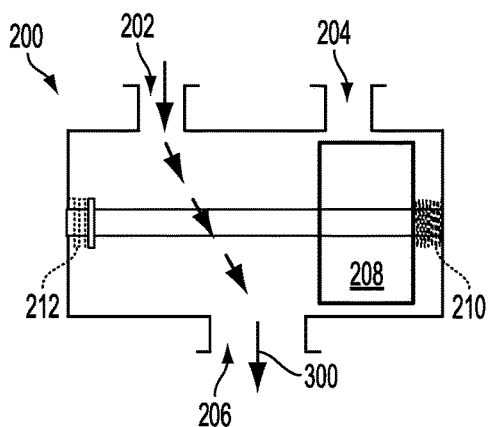
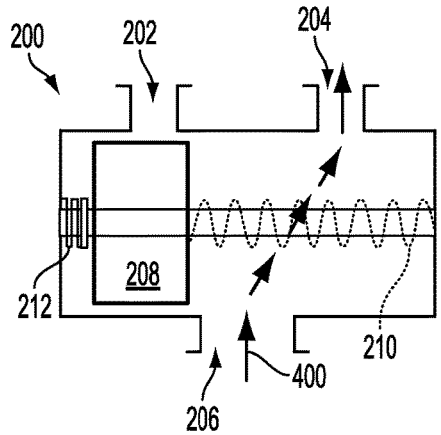

TURBOCHARGER CONTROL

FIELD

The present application relates to systems for controlling a turbocharger of an engine with a wastegate.

BACKGROUND AND SUMMARY

Engines may use a turbocharger to improve engine torque/power output density. In one example, a turbocharger may include a compressor and a turbine connected by a drive shaft, where the turbine is coupled to the exhaust manifold side and the compressor is coupled to the intake manifold side. In this way, the exhaust-driven turbine supplies energy to the compressor to increase the pressure in the intake manifold (e.g. boost, or boost pressure) and to increase the flow of air into the engine. The boost may be controlled by adjusting the amount of gas reaching the turbine, such as with a wastegate.

In one example, the wastegate may include a first port coupled to boost pressure, a second port coupled to atmospheric pressure, and a valve configured to control the flow of exhaust gasses according to the wastegate duty cycle. This configuration may be referred to as a "boost-based" configuration because the force to actuate the wastegate valve comes from the boost pressure. For example, a solenoid valve may connect a wastegate canister chamber having a wastegate canister pressure to the first port coupled to boost pressure and the second port coupled to atmospheric pressure. When the solenoid valve is in a first position, the first port and the wastegate canister chamber are in communication and the wastegate canister pressure will increase toward boost pressure. When the solenoid valve is in a second position, the second port and the wastegate canister chamber are in communication and the wastegate canister pressure will decrease toward atmospheric pressure. By moving the solenoid valve from the first position to the second position via the wastegate (solenoid) duty cycle, the wastegate canister pressure may be maintained at a value between the boost pressure and the atmospheric pressure. The wastegate canister pressure may be used to actuate the wastegate valve and thus control the boost pressure. Thus, the position of the wastegate valve may be determined by the boost pressure, atmospheric pressure, and the wastegate duty cycle.

The inventors herein have recognized that the wastegate is used to control the boost pressure, and the boost pressure relative to atmospheric pressure provides the motive force for moving the wastegate. For example, the atmospheric pressure may change with altitude or weather conditions which may affect the pressure difference between boost and atmospheric pressure, and hence the ability to control the boost pressure. Additionally, a circular interaction of controlling the boost pressure with the wastegate and actuating the wastegate with the boost pressure makes the wastegate operation less predictable than desired. One approach to address the above issues is a method that includes actuating the wastegate with boost pressure generated by the turbocharger. The wastegate is adjusted according to a difference between the boost pressure and the atmospheric pressure. In this way, the interdependency between controlling the boost pressure and using the boost pressure to actuate a boost-based wastegate is reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2 shows a schematic of a wastegate including a solenoid valve, a wastegate canister, and a wastegate arm.

FIGS. 3 and 4 show an example of how the solenoid valve can be modulated to control the pressure of the wastegate canister.

DETAILED DESCRIPTION

Figure 1:
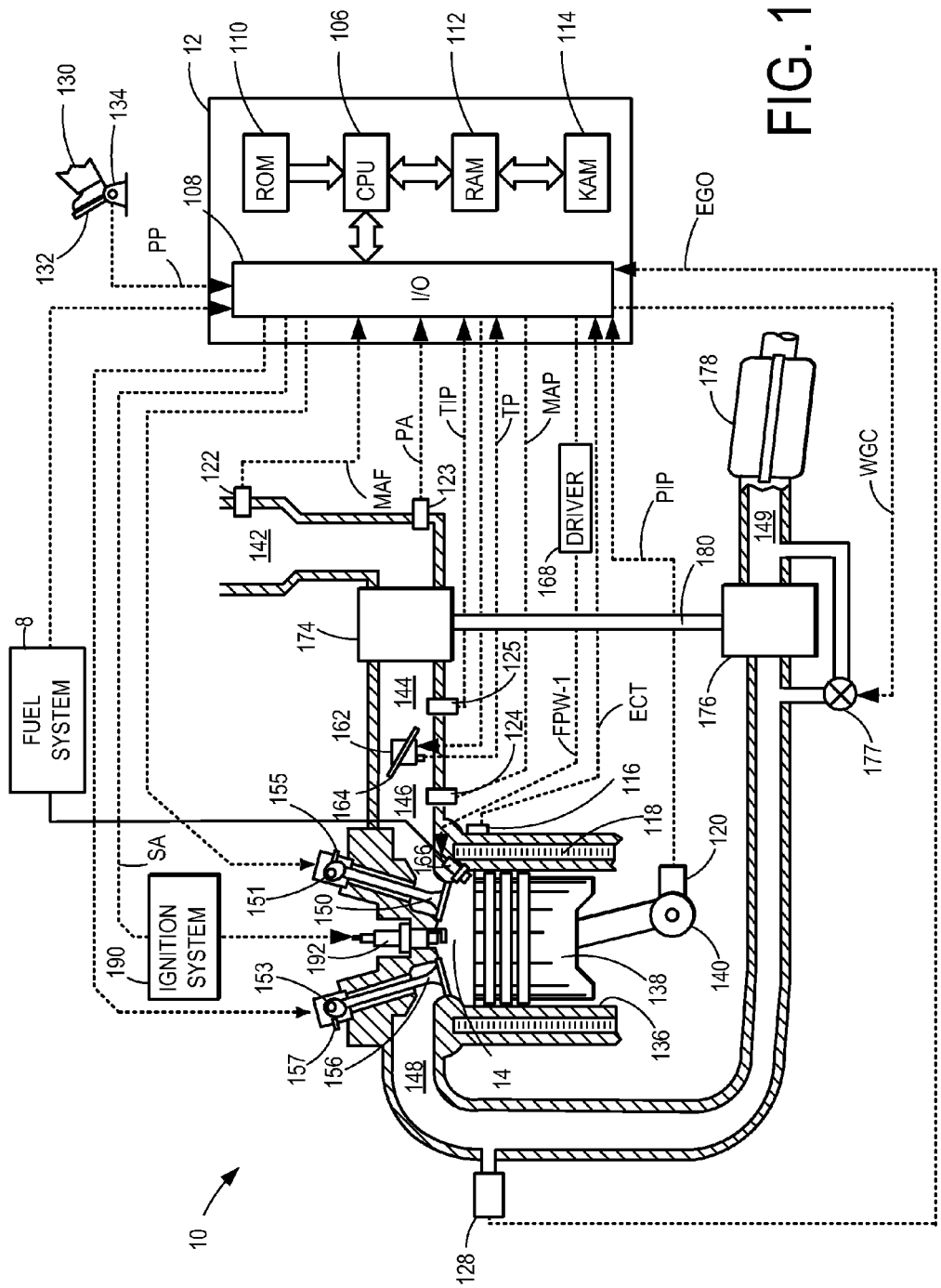
FIG. 1 shows a block diagram of a turbocharged engine including a wastegate.
Figure 5:
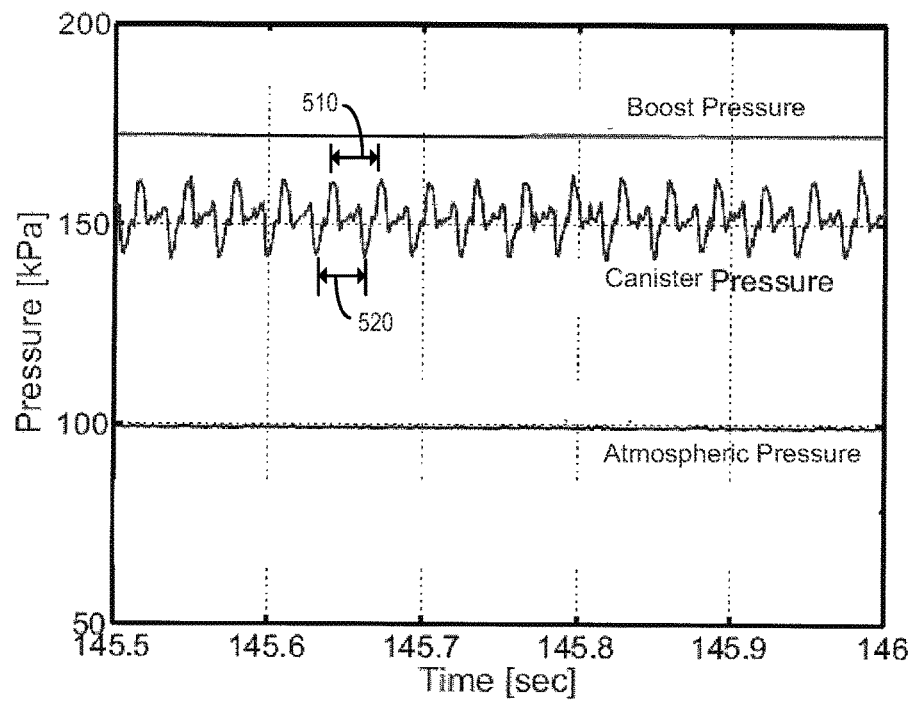
FIG. 5 shows prophetic data of wastegate canister pressure.
Figure 7:
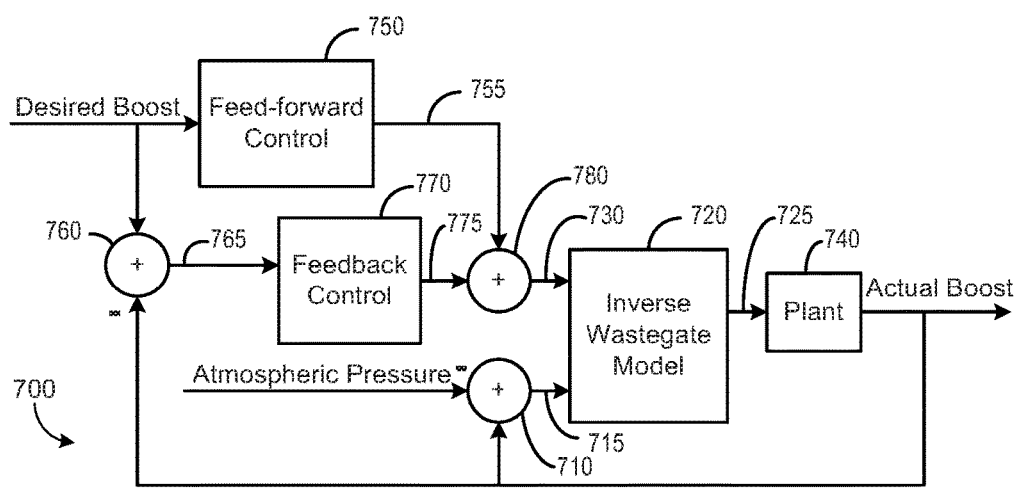
FIGS. 6 and 7 show example methods of controlling the turbocharger via a wastegate.
Figure 6:
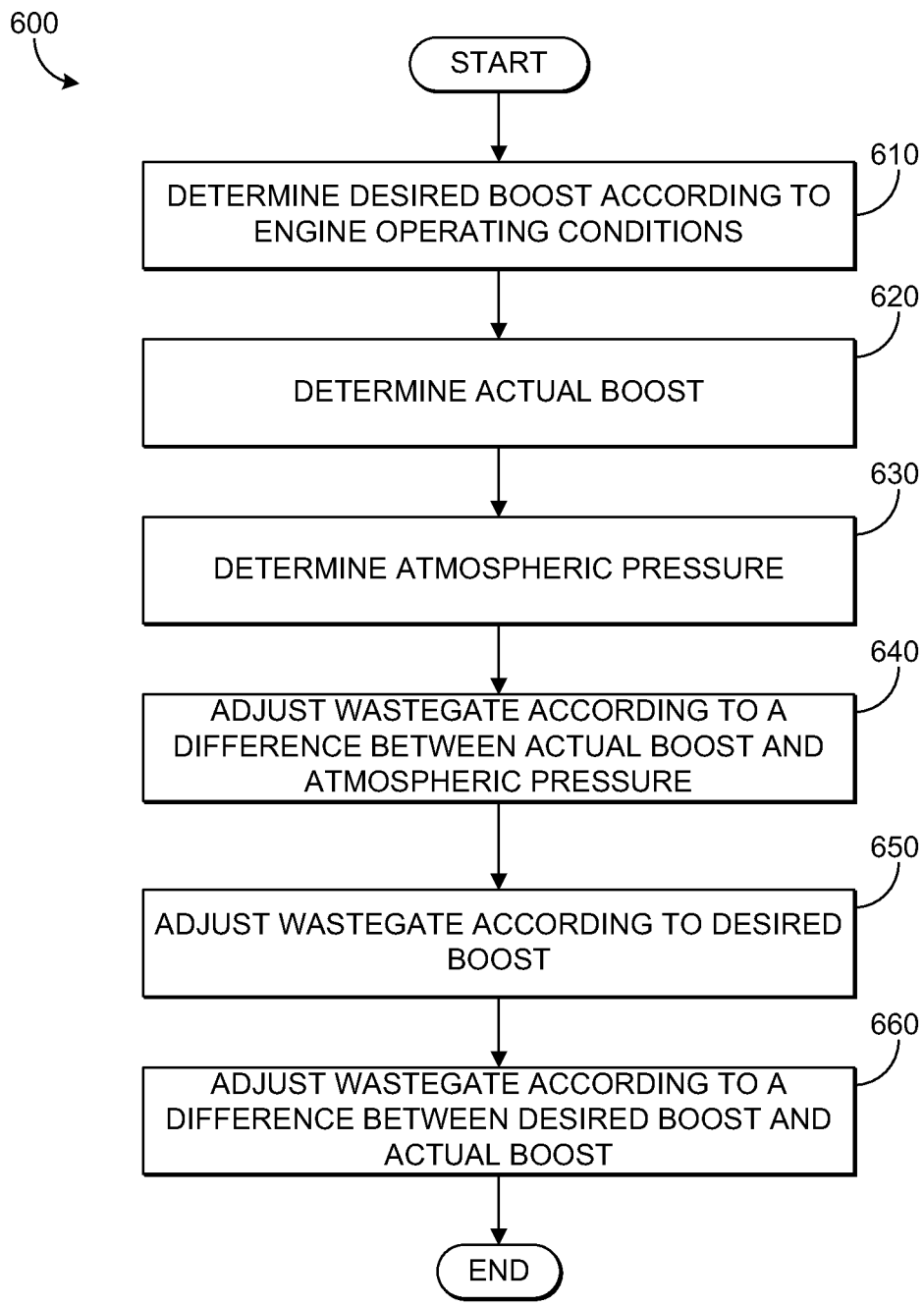

The following description relates to systems for controlling turbochargers of internal combustion engines via a wastegate. An example embodiment of an engine with a turbocharger including a wastegate is illustrated in FIG. 1. In the example configuration, the force for actuating the wastegate is provided by the boost pressure. The example wastegate is shown in more detail in FIG. 2. The example wastegate comprises a solenoid valve and a wastegate canister. In FIGS. 3 and 4, the solenoid valve is shown in two positions to illustrate how the solenoid valve may be used to control the pressure of the wastegate canister. FIG. 5 illustrates prophetic data of wastegate canister pressure when the solenoid valve is modulated as described in FIGS. 3 and 4. A force generated by the wastegate canister pressure may be used to actuate the wastegate valve to control the turbocharger. The wastegate of FIG. 2 may be adjusted using a control routine, such as illustrated in FIGS. 6 and 7, for controlling the turbocharger. In this manner, the physical interaction between controlling the boost pressure and using the boost pressure to actuate the wastegate may be reduced in a turbocharger system that uses boost pressure for actuating the wastegate.

FIG. 1 shows an example of a turbocharged engine including a wastegate. Internal combustion engine 10 comprises a plurality of cylinders, one cylinder of which is shown in FIG. 1. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a turbocharger boosting device. For example, engine 10 is configured with a turbocharger including a compressor 174 arranged between intake passages 142 and 144, and an exhaust turbine 176 arranged between exhaust passages 148 and 149. Specifically, air passage 142 is connected to the compressor inlet, air passage 144 is connected to the compressor outlet, exhaust passage 148 is connected to the turbine inlet, and exhaust passage 149 is connected to the turbine outlet. Compressor 174 may be at least partially powered by exhaust turbine 176 via a shaft 180. Wastegate 177 includes a path for exhaust gasses to flow from exhaust passage 148 away from turbine 176 to exhaust passage 149. The energy supplied by turbine 176 may be controlled by controlling the amount of exhaust gas reaching turbine 176 from exhaust passage 148. Specifically, the boost pressure may be adjusted by the WGC signal received from controller 12 by modulating a degree of opening, and/or a duration of opening, of a wastegate valve.

In the example embodiment, wastegate 177 is pneumatically actuated to control the wastegate valve and hence the boost pressure. In what is known as a "boost-based" wastegate configuration, wastegate 177 comprises a solenoid valve including a first port (not shown) connected to intake passage 146 and a second port (not shown) connected to an intake passage at atmospheric pressure, such as intake passage 142. The pressure of the first port is at the boost pressure and may be measured with sensor 125. The measurement may be sent to controller 12 via the TIP signal. Atmospheric pressure may be measured by sensor 123 and the measurement may be transmitted to controller 12 via the PA signal. In the example embodiment, the wastegate valve is normally closed, but force supplied by the boost pressure may be used to open the wastegate valve.

A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of turbine 176 and emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO, a NOx, HC, or CO sensor, for example. Emission control device 178 may be a three way catalyst (TWC), NOx trap, various other emission control devices, or combinations thereof.

Exhaust temperature may be measured by one or more temperature sensors (not shown) located in exhaust passages 148 and 149. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder. The opening and closing of the valves may be controlled by hydraulically actuated lifters coupled to valve pushrods, or via a cam profile switching mechanism. For example, intake valve 150 and exhaust valve 156 may be controlled by cam actuation via respective cam actuation systems 151 and 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In one specific example, twin independent variable cam timing may be used, where each of the intake cam and the exhaust cam can be independently adjusted by the control system.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel, as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

Controller 12 is shown in FIG. 1 as a microcomputer, including microprocessor unit 106, input/output ports 108, an electronic storage medium for executable programs and calibration values shown as read only memory (ROM) chip 110 in this particular example, random access memory (RAM) 112, keep alive memory (KAM) 114, and a data bus. Storage medium read-only memory 110 can be programmed with computer readable data representing instructions executable by processor 102 for performing the methods described below as well as other variants that are anticipated but not specifically listed. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; throttle inlet pressure (TIP) from sensor 125, and absolute manifold air pressure signal (MAP) from sensor 124. Engine speed signal, RPM, may be generated by controller 12 from signal PIP. Further, crankshaft position, as well as crankshaft acceleration, and crankshaft oscillations may also be identified based on the signal PIP. Manifold air pressure signal MAP from manifold pressure sensor 124 may be used to provide an indication of vacuum, or pressure, in the intake manifold. Further, manifold pressure may be estimated based on other operating parameters, such as based on MAF and RPM, for example.

Continuing now with FIG. 2, a schematic of an example embodiment of wastegate 177 including solenoid valve 200, wastegate canister 230, wastegate arm 240 and mechanical linkages 250 is illustrated. Mechanical linkages 250 may convert the translational motion of mechanical arm 240 into a rotational motion of the wastegate valve. In other words, by moving mechanical arm along direction 260, the wastegate valve may open or close so that exhaust gasses may be directed away from or toward turbine 176, respectively. Wastegate arm 240 is attached to diaphragm 232 such that when a pressure difference is created across diaphragm 232, it may force wastegate arm 240 away from its default position and open the wastegate valve. Spring 234, attached to wastegate arm 240, forces wastegate arm 240 toward its default position. In the example embodiment, the default position of wastegate arm 240 closes the wastegate valve.

The position of the wastegate valve is determined by the pressure inside canister volume 236 which is determined by the flow of gasses between solenoid valve 200 and canister volume 236 via connecting tube 220. Gas flow is determined by the position of shuttle 208 and the pressures at first port 202, second port 204, and control port 206. Shuttle 208 may move along direction 214 as determined by the forces from coil 212 and spring 210. In the example embodiment, first port 202 is connected to intake passage 146 at boost pressure, second port 204 is connected to intake passage 142 at atmospheric pressure, and control port 206 is connected to canister volume 236 at canister pressure.

In FIG. 2, shuttle 208 is blocking control port 206 so gasses are substantially prevented from flowing between solenoid valve 200 and wastegate canister 230. In the example embodiment, the position of shuttle 208 in FIG. 2 may be in a transient position. FIG. 3 illustrates the position of shuttle 208 in a steady-state position when coil 212 is discharged, such as when the WGC signal is driven low. When the coil is discharged, the force of spring 210 acting on shuttle 208 may hold shuttle 208 near spring 210 in solenoid valve 200. In this position, port 204 is blocked by shuttle 208 and a channel is open between ports 202 and 206. When the boost pressure exceeds the canister pressure, gasses may flow from port 202 to 206 as shown by arrows 300, and the canister pressure may be increased.

FIG. 4 illustrates shuttle 208 in a steady-state position when coil 212 is charged, such as when the WGC signal is driven high. When the coil is charged, the force of coil 212 may exceed the force of spring 210 acting on shuttle 208 so shuttle 208 may be positioned near coil 212 in solenoid valve 200. In this position, port 202 is blocked by shuttle 208 and a channel is open between ports 204 and 206. When the canister pressure exceeds the atmospheric pressure, gasses may flow from port 206 to 204 as shown by arrows 400, and the canister pressure may be decreased.

Pulse width modulation (PWM) may be used to drive the WGC signal connected to coil 212. A PWM signal may alternate between a high value and a low value at a given frequency and a duty cycle, where the duty cycle is defined as the proportion of time the signal is high divided by the period of the signal. In this manner, shuttle 208 may be actuated in a first direction (opening the channel between ports 204 and 206) when the WGC signal is high and shuttle 208 may be actuated in a second direction opposite the first direction (opening the channel between ports 202 and 206) when the WGC signal is low. By controlling the duty cycle of the WGC signal, an intermediate canister pressure between the boost pressure and atmospheric pressure may be maintained in canister volume 236. The prophetic data of FIG. 5 illustrates how a PWM signal may be used to control the wastegate canister pressure. In FIG. 5, the intermediate canister pressure may be obtained by modulating the WGC signal at approximately 32 Hz. The PWM period can be measured as the time between peaks 510 or valleys 520 of the canister pressure. In alternative embodiments, the PWM frequency may be less than 200 Hz.

The average canister pressure may be increased by increasing the duration that ports 202 and 206 are in communication, such as when the WGC signal is low and coil 212 is discharged. In this manner, the canister pressure may be increased toward the boost pressure. The average canister pressure may be decreased by increasing the duration that ports 204 and 206 are in communication, such as when the WGC signal is high and coil 212 is charged. In this manner, the canister pressure may be decreased toward atmospheric pressure. Thus, the canister pressure may be adjusted by adjusting the duty cycle of the WGC signal. Specifically, the canister pressure may be increased by decreasing the duty cycle of the WGC signal and the canister pressure may be decreased by increasing the duty cycle of the WGC signal.

The canister pressure may be determined by the duty cycle of the WGC signal, the boost pressure, and the atmospheric pressure. For different atmospheric pressures, a given wastegate command may change the canister pressure by different amounts. For example, at high altitudes with lower atmospheric pressure, a difference between the boost pressure and the atmospheric pressure is greater than at low altitudes with higher atmospheric pressure. As the difference between the boost pressure and the atmospheric pressure increases, the canister pressure may be changed more rapidly. Thus, a wastegate command may be adjusted according to atmospheric pressure. For example, as atmospheric pressure increases, the wastegate command may be adjusted to increase actuation of the wastegate. As atmospheric pressure decreases, the wastegate command may be adjusted to decrease actuation of the wastegate. Similarly for different boost pressures, the wastegate command changes the canister pressure by different amounts. For example, as the boost level increases, the canister pressure may change more rapidly and the wastegate duty cycle may be adjusted to reduce the actuation of the wastegate.

The canister pressure may determine the degree that the wastegate valve is open or closed which determines the energy produced by the turbine and hence the boost. Since the boost pressure is the controlled variable and also the source for powering the wastegate, a control method that decouples the interaction between powering the wastegate and controlling the boost is desirable.

As further elaborated with reference to FIG. 6, a method 600 may be executed by an engine controller, such as 12, for controlling the turbocharger via boost-based wastegate 177. In one example, a method of controlling a turbocharger of an engine via a wastegate may comprise determining an atmospheric pressure and an actual boost pressure. The wastegate may be adjusted according to a difference between the actual boost pressure and the atmospheric pressure.

Continuing with FIG. 6, at 610, the method includes determining a desired boost according to engine operating conditions. The conditions assessed may be directly measured with sensors, such as sensors 116, 120, 122, 123, and 128 for example, and/or the conditions may be estimated from other engine operating conditions. The assessed conditions may include engine oil temperature, engine speed, idle speed, barometric pressure, a driver-demanded torque (for example, from a pedal-position sensor), manifold air flow (MAF), air temperature, vehicle speed, etc.

Next, at 620, an actual boost may be determined. The actual boost may be directly measured from a sensor, such as sensor 125. The measurement may be sent to controller 12 via the TIP signal and stored in a computer readable storage medium. In an alternative embodiment, the actual boost may be estimated based on other operating parameters, such as based on MAP and RPM, for example.

Next, at 630, atmospheric pressure may be determined. For example, atmospheric pressure may be measured near the compressor inlet, such as with sensor 123. The measurement may be sent to controller 12 via the PA signal and stored in a computer readable storage medium. In an alternative embodiment, the atmospheric pressure may be estimated based on other operating parameters.

Next, at 640, a wastegate actuation force may be calculated from a difference between the actual boost and atmospheric pressure. The wastegate may be adjusted according to the wastegate actuation force. Since the wastegate actuation force may accurately resemble the pressure differential between first port 202 and second port 204 of solenoid valve 200, the interaction between powering wastegate 177 and controlling the boost may be reduced. For example, the wastegate actuation force may be used as an input to an inverse wastegate model. The inverse wastegate model may map a desired wastegate canister pressure or a desired wastegate valve position to a wastegate duty cycle for a given wastegate actuation force. Mapping to a wastegate duty cycle may include using look-up tables or calculating the wastegate duty cycle. The WGC signal may be pulse width modulated at the wastegate duty cycle to adjust the wastegate. The desired wastegate canister pressure or the desired wastegate valve position may be determined from feed-forward, feedback, or other control algorithms, for example.

The wastegate actuation force may also affect the dynamics of the wastegate. For example, canister volume 236 may fill faster at higher altitudes having lower atmospheric pressures than at lower altitudes having higher atmospheric pressures. A compensation term may account for delays of the wastegate actuator, as described herein with regard to the controller with zeros cancelling poles of the wastegate actuator model. The compensation term may be decreased for lower atmospheric pressures to account for faster dynamic actuation of the wastegate valve at lower atmospheric pressures. Similarly, the compensation term may be increased for higher atmospheric pressures to account for slower dynamic actuation of the wastegate valve at higher atmospheric pressures. Additionally, the compensation term may further include adjustments based on movement of twin independent cams, which can affect boost pressure. For example, as the intake cam is moved in a way that would increase boost pressure relative to atmospheric pressure, the magnitude of the compensation term may be decreased. Likewise, as the intake cam is moved in a way that would decrease boost pressure relative to atmospheric pressure, the magnitude of the compensation term may be increased.

In another example, the compensation term may be adjusted to account for blow-through (e.g. scavenging) operation with large valve overlap. In a turbocharged (boosted) engine, blow-through may occur when the intake pressure is higher than the exhaust pressure, and some amount of fresh air may flow directly from the intake manifold to the exhaust manifold during the valve overlap period without participating in cylinder combustion. Boosted engines may be intentionally operated in this way by advancing intake cam timing and retarding the exhaust cam timing to improve volumetric efficiency and reduce turbo lag. However, the blow-through air is cooler (because it is not combusted) and hence adds less energy to the exhaust system and the turbine compared to an engine without blow-through. To account for the blow-through air, the wastegate operation may be adjusted for the fraction of blow-through air by modifying the feedforward schedules and increasing the feedback gains. For example, increasing the compensation term may account for the lower exhaust energy that may result in lower gain in the feedback loop and slower system response without this adjustment. In yet another example, the compensation term may be adjusted to account for changes in boost pressure caused by movement of throttle plate 164.

Next, at 650, the wastegate may be adjusted according to the desired boost. For example, the desired boost may be used as an input to a feed-forward control algorithm for adjusting the wastegate. The feed-forward control algorithm may calculate a target wastegate canister pressure or a target wastegate valve position that may be used as a component of an input to the inverse wastegate model to determine the wastegate duty cycle.

Next, at 660, a boost error may be calculated as a difference between the desired boost and the actual boost. The wastegate may be adjusted according to the boost error. For example, the boost error may be used as an input to a feedback control algorithm to calculate a target wastegate canister pressure or a target wastegate valve position that may be used as a component of an input to the inverse wastegate model to determine the wastegate duty cycle. The control algorithm may include a compensation term to account for delays caused by filling and emptying canister volume 236. The magnitude of the compensation term may be increased as atmospheric pressure increases to account for slower filling and emptying of canister volume 236. The magnitude of the compensation term may be decreased as atmospheric pressure decreases to account for faster filling and emptying of canister volume 236.

In this manner, method 600 may be used to substantially reduce the interaction between powering wastegate 177 and controlling the boost. As further elaborated with reference to FIG. 7, a method 700 may be implemented using the steps of method 600.

The desired boost pressure, actual boost pressure, and atmospheric pressure are determined and shown as inputs to method 700. At 710, wastegate actuation force 715 is a feedback component that is calculated from the difference between the actual boost pressure and atmospheric pressure.

Wastegate actuation force 715 may be an input to inverse wastegate model 720. A target wastegate canister pressure 730 may be used as another input to inverse wastegate model 720. In an alternate embodiment, a target wastegate valve position may be used as another input to inverse wastegate model 720. Inverse wastegate model 720 may map the target wastegate canister pressure 730 to wastegate duty cycle 725 for wastegate actuation force 715. The WGC signal may be pulse width modulated at wastegate duty cycle 725 to adjust wastegate 177 of engine 10. Plant 740 includes engine 10.

Feed-forward control 750 includes the desired boost as an input to determine a feed-forward component 755 of the target wastegate canister pressure 730. Feed-forward control 750 may include a static feed-forward term and/or a dynamic feed-forward term. The static feed-forward term may calculate a feed-forward component from one or more engine operating conditions, including the desired boost, for example. The dynamic feed-forward term may calculate a feed-forward component from a time rate of change of one or more engine operating conditions, including a time rate of change of the desired boost, for example. At 760, boost error 765 may be calculated as a difference between the desired boost and the actual boost. Boost error 765 may be used as an input to feedback control 770 to determine a feedback component 775 of the target wastegate canister pressure 730. Feedback control 770 may include a proportional-integral (PI) controller or a proportional-integral-derivative (PID) controller. Feedback control 770 may include a lead/lag filter, or compensation term, to account for the dynamics of wastegate canister 230 filling and emptying. The compensation term may be adjusted according to wastegate duty cycle 725 or wastegate actuation force 715. For example, the feedback control 770 may have a transfer function such as:

$$-((twg*s+1)/(C_1*s+1))*((kp*s+ki)/(s)),$$

where twg is the time constant of the wastegate, and $C_1$ may be experimentally determined for a system. In one embodiment, $C_1$ may be 0.05. The zero of the lead filter (1/twg) may be used to cancel the pole from the wastegate canister pressure dynamics. The zero of the PI controller (ki/kp) may be used to cancel the system pole (1/tsys), where tsys is the time constant of the open loop system.

The feed-forward component 755 and the feedback component 775 may be combined by adder 780 to obtain the target wastegate canister pressure 730. In this manner, method 700 may substantially reduce the interaction between powering wastegate 177 and controlling the actual boost pressure.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be encoded as microprocessor instructions and stored into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, gasoline, diesel and other engine types and fuel types. The subject matter of the present disclosure includes all novel and nonobvious combinations and sub-combinations of the various systems and configurations, and other features, functions, and/or properties disclosed herein.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method of controlling a turbocharger of an engine via a wastegate, the method comprising:
   actuating the wastegate with atmospheric pressure in a first direction;
   actuating the wastegate with boost pressure generated by the turbocharger in a second direction opposite the first direction;
   determining each of an actual boost pressure and a desired boost pressure;
   determining the atmospheric pressure;
   determining a difference between the actual boost pressure and the atmospheric pressure; and
   adjusting the wastegate via a wastegate duty cycle having a feedback component determined according to the difference between the determined actual boost pressure and the determined atmospheric pressure and a feedforward component determined based on the desired boost pressure.

2. The method of claim 1 wherein the difference between the determined actual boost pressure and the determined atmospheric pressure is a first difference and the feedback component is a first feedback component, the method further comprising determining a second difference between the determined desired boost pressure and the determined actual boost pressure, and further adjusting the wastegate duty cycle with a second feedback component determined based on the second difference, and wherein an actuation in the first direction is adjusted based on the atmospheric pressure, including increasing actuation for a given wastegate command at higher atmospheric pressures, and decreasing actuation for the given wastegate command at lower atmospheric pressures.

3. The method of claim 2 wherein the increased actuation at higher atmospheric pressures includes an increased dynamic actuation, and wherein the decreased actuation at lower atmospheric pressures includes a decreased dynamic actuation.

4. The method of claim 1 wherein the wastegate comprises an actuator, the actuator having a first port coupled to a source of the boost pressure, a second port coupled to a source of the atmospheric pressure, and a canister port coupled to a canister; and
   wherein adjusting the wastegate comprises applying the wastegate duty cycle to a coil within the actuator, the wastegate duty cycle defined as a proportion of time a pulse width modulation signal is high divided by a period of the signal.

5. The method of claim 4 wherein adjusting the wastegate duty cycle in a first direction increases canister pressure by increasing a duration the first port is in communication with the canister port, and adjusting the wastegate duty cycle in a second direction opposite the first direction decreases the canister pressure by decreasing a duration the second port is in communication with the canister port, and wherein the canister pressure determines a position of the wastegate.

6. The method of claim 4 wherein the wastegate includes a solenoid valve, and adjusting the wastegate duty cycle comprises adjusting a duty cycle of the solenoid valve.

7. The method of claim 1 wherein the feedback component determined according to the difference between the determined actual boost pressure and the determined atmospheric pressure includes a compensation term, and wherein adjusting the wastegate further comprises adjusting the wastegate duty cycle according to the compensation term to account for delays of an actuator.

8. The method of claim 7 wherein the compensation term is increased as atmospheric pressure increases.

9. The method of claim 7 wherein the compensation term is decreased as atmospheric pressure decreases.

10. The method of claim 1 wherein adjusting the wastegate comprises:
determining a target canister pressure of the wastegate from the feedforward component;
calculating the wastegate duty cycle according to the target canister pressure of the wastegate and the feedback component; and
applying the wastegate duty cycle to the wastegate.

11. The method of claim 10 wherein determining the target canister pressure of the wastegate comprises one or more of:
determining the target canister pressure according to one or more engine operating conditions; and
determining the target canister pressure according to a time rate of change of one or more engine operating conditions.

12. The method of claim 10 wherein determining the target canister pressure of the wastegate comprises one or more of:
determining the target canister pressure according to a difference between the desired boost pressure and the determined actual boost pressure; and
determining the target canister pressure according to a time rate of change of the target canister pressure and the difference between the desired boost pressure and the determined actual boost pressure.

13. A method of controlling a turbocharger of an engine via a wastegate, the wastegate comprising a first port coupled to a source of boost pressure generated by the turbocharger, a second port coupled to a source of atmospheric pressure, and a solenoid valve configured to control a flow of exhaust gases according to a wastegate duty cycle, the method comprising:
adjusting the wastegate with the wastegate duty cycle, the boost pressure and the atmospheric pressure, the wastegate actuated with the atmospheric pressure in a first direction and actuated with the boost pressure in a second, opposite direction;
determining a first difference between actual boost pressure and the atmospheric pressure;
determining a second difference between a desired boost pressure and the actual boost pressure;
adjusting the wastegate duty cycle according to the first difference between the actual boost pressure and the atmospheric pressure; and
further adjusting the wastegate duty cycle according to the second difference between the desired boost pressure and the actual boost pressure.

14. The method of claim 13 further comprising:
determining the desired boost pressure according to engine operating conditions; and
feedforward adjusting the wastegate duty cycle according to the desired boost pressure, wherein the adjusting according to the first difference is a first feedback adjustment, and wherein the adjusting according to the second difference is a second feedback adjustment.

15. The method of claim 13 wherein the wastegate includes an actuator, and wherein the method further comprises:
adjusting the wastegate duty cycle according to an amount of a compensation term for accounting for delays of the wastegate.

16. The method of claim 13 wherein the wastegate includes an actuator, and wherein the method further comprises:
adjusting the wastegate duty cycle according to a time rate of change of one or more engine operating conditions and according to adjustment of valve timing.

17. The method of claim 16, wherein the wastegate duty cycle is applied to a coil within the actuator, and wherein the wastegate duty cycle is defined as a proportion of time a pulse width modulation signal is high divided by a period of the signal.

18. A system for an engine comprising:
a turbocharger;
a wastegate comprising a first port coupled to boost pressure, a second port coupled to atmospheric pressure, and a solenoid valve configured to control a flow of exhaust gasses according to a wastegate duty cycle;
the wastegate actuated with the atmospheric pressure in a first direction and actuated with the boost pressure in a second, opposite direction;
a sensor for measuring boost pressure;
a computer readable storage medium having instructions encoded therein, including:
instructions for actuating the wastegate with the boost pressure generated by the turbocharger and with the atmospheric pressure; and
instructions for adjusting the wastegate duty cycle according to a first difference between the measured boost pressure and the atmospheric pressure and a second difference between a desired boost pressure and the measured boost pressure; and
actuating the wastegate based on the instructions encoded on the computer readable storage medium.

19. The system of claim 18, wherein the computer readable storage medium having instructions encoded therein, further comprises:
instructions for determining the desired boost pressure; and
instructions for adjusting the wastegate duty cycle according to a feedforward control based on the desired boost pressure.

20. The system of claim 18, wherein the computer readable storage medium having instructions encoded therein, further comprises:
instructions for determining the desired boost pressure; and instructions for adjusting the wastegate duty cycle according to a difference between boost pressure and the desired boost pressure.

* * * * *